(12) United States Patent
Chamberlain (10) Patent No.: US 8,770,608 B1
(45) Date of Patent: Jul. 8, 2014

(54) BICYCLE FRONT DERAILLEUR MOUNT (71) Applicant: Specialized Bicycle Components, Inc., Morgan Hill, CA (US)

(72) Inventor: Jason L. Chamberlain, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/767,375

(22) Filed: Feb. 14, 2013

(51) Int. Cl.
 *B62K 3/02* (2006.01)
 *B62M 9/135* (2010.01)
(52) U.S. Cl.
 CPC . *B62M 9/135* (2013.01); *B62K 3/02* (2013.01)
 USPC .............................. 280/261; 280/284; 474/80
(58) Field of Classification Search
 USPC ................. 280/259, 260, 261, 275, 283, 284; 474/78, 79, 80, 81, 82
 See application file for complete search history.

(56) References Cited

U.S. PATENT DOCUMENTS

| | | |
|---|---|---|
| 4,330,137 A | 5/1982 | Nagano |
| 5,460,396 A | 10/1995 | Sutter et al. |
| 5,620,384 A | 4/1997 | Kojima et al. |
| 5,846,148 A | 12/1998 | Fujii |
| 6,612,950 B2 | 9/2003 | Nanko |
| 7,377,535 B2 | 5/2008 | Chamberlain |
| 7,392,999 B2 | 7/2008 | O'Connor |
| 7,651,424 B2 | 1/2010 | Yamamoto et al. |
| 7,722,487 B2 | 5/2010 | Ichida et al. |
| 7,867,118 B2 | 1/2011 | Yamamoto et al. |
| 8,075,009 B2 | 12/2011 | Cocalis et al. |
| 2006/0068955 A1 | 3/2006 | Oi |

*Primary Examiner* — Kevin Hurley
(74) *Attorney, Agent, or Firm* — Michael Best & Friedrich LLP (57) ABSTRACT

A bicycle including a bicycle frame that has a main frame and a rear frame coupled to the main frame for pivotal movement about a pivot axis, and a derailleur mount that is coupled to the bicycle frame. The derailleur mount has a first mounting portion that is concentric with the pivot axis and defining a plane, a second mounting portion that is secured to the rear frame at a location spaced laterally from the plane, and a support portion. A derailleur is attached to the support portion.

7 Claims, 7 Drawing Sheets

BICYCLE FRONT DERAILLEUR MOUNT

BACKGROUND

The present invention relates generally to bicycles and specifically to front derailleur mounts for bicycles having a rear suspension.

Many bicycles have front and rear derailleurs that facilitate moving the drive chain between multiple cogs or sprockets to allow operation of the bicycle at different gear ratios. Front derailleurs are commonly mounted on or near the seat tube of the bicycle frame.

Some bicycles have rear suspension that allows the rear wheel to move vertically relative to the main frame in order to provide shock absorption when the rear wheel encounters a bump. On such bicycles, portions of the drive chain will move vertically with the rear wheel relative to the main frame. When the front derailleur is mounted to the seat tube, vertical movement of the rear wheel will result in vertical movement of the chain relative to the front derailleur. This movement of the chain relative to the front derailleur can adversely affect the shifting performed by the front derailleur.

SUMMARY

The present invention provides a bicycle including a bicycle frame that has a main frame and a rear frame coupled to the main frame for pivotal movement about a pivot axis, and a derailleur mount that is coupled to the bicycle frame. The derailleur mount has a first mounting portion that is concentric with the pivot axis and defining a plane, a second mounting portion that is secured to the rear frame at a location spaced laterally from the plane, and a support portion. A derailleur is attached to the support portion.

In another embodiment, the invention provides a bicycle including a bicycle frame that has a main frame and a rear frame coupled to the main frame for pivotal movement about a pivot axis. The bicycle also includes a derailleur mount that is coupled to the bicycle frame. The derailleur mount has a first mounting portion that is substantially perpendicular to the pivot axis, a second mounting portion that is non-parallel to the first mounting portion and secured to the frame, and a support portion. A derailleur is attached to the support portion.

In another embodiment, the invention provides a derailleur mount including a mounting portion adapted to be coupled to a bicycle frame, a support portion adapted to support a derailleur, and a cable opening adapted to receive the bicycle cable.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
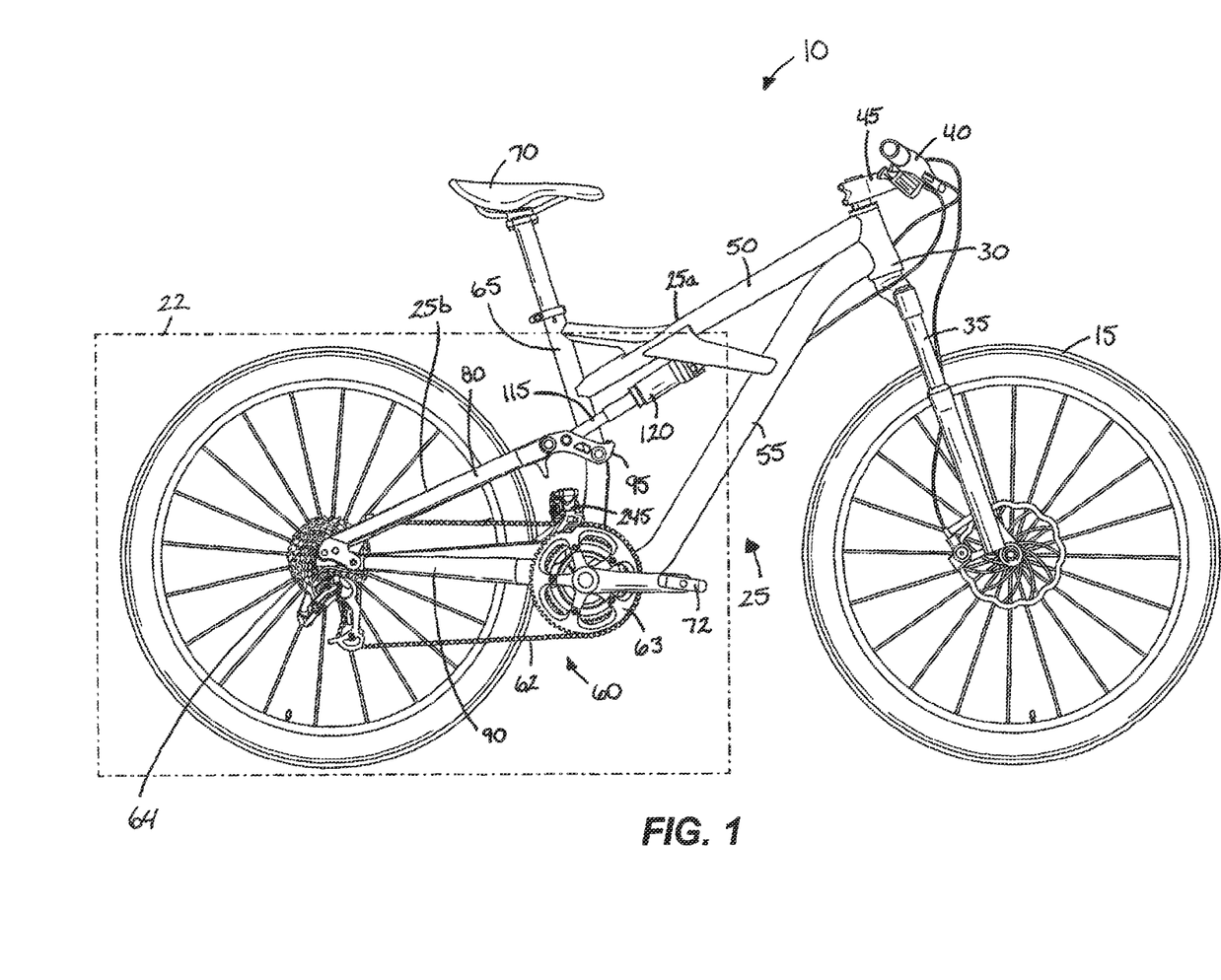
FIG. 1 is a side view of a bicycle including a bicycle frame and a front derailleur mount embodying the present invention.

FIG. 1 illustrates a bicycle 10 including a front wheel 15, a rear wheel 20 that defines a central plane 22 of the bicycle 10, and a frame 25 that has a main frame portion 25a (e.g., a front triangle) and a rear frame portion 25b (e.g., a rear triangle). The main frame 25a has a head tube 30 and a front fork 35 rotationally supported by the head tube 30 and that secures the front wheel 15 to the frame 25. A handlebar assembly 40 is coupled to the head tube 30 and is secured to the front fork 35 by a stem assembly 45. The main frame 25a also has a top tube 50 connected to and extending rearward from the head tube 30, and a down tube 55 connected to the head tube 30 below the top tube 50 and extending generally downward toward a drive train 60 supported by a bottom bracket 61 (see FIG. 2). The drive train 60 drives a chain 62 that connects a front sprocket assembly 63 supported by the bottom bracket 61 to a rear sprocket assembly 64 supported on the rear wheel 20. A seat tube 65 is connected to the top tube 50 and the down tube 55, and a seat 70 is supported by the seat tube 65. Pedals 72 are attached to the bicycle 10 to engage the drive train 60.

Figure 2:
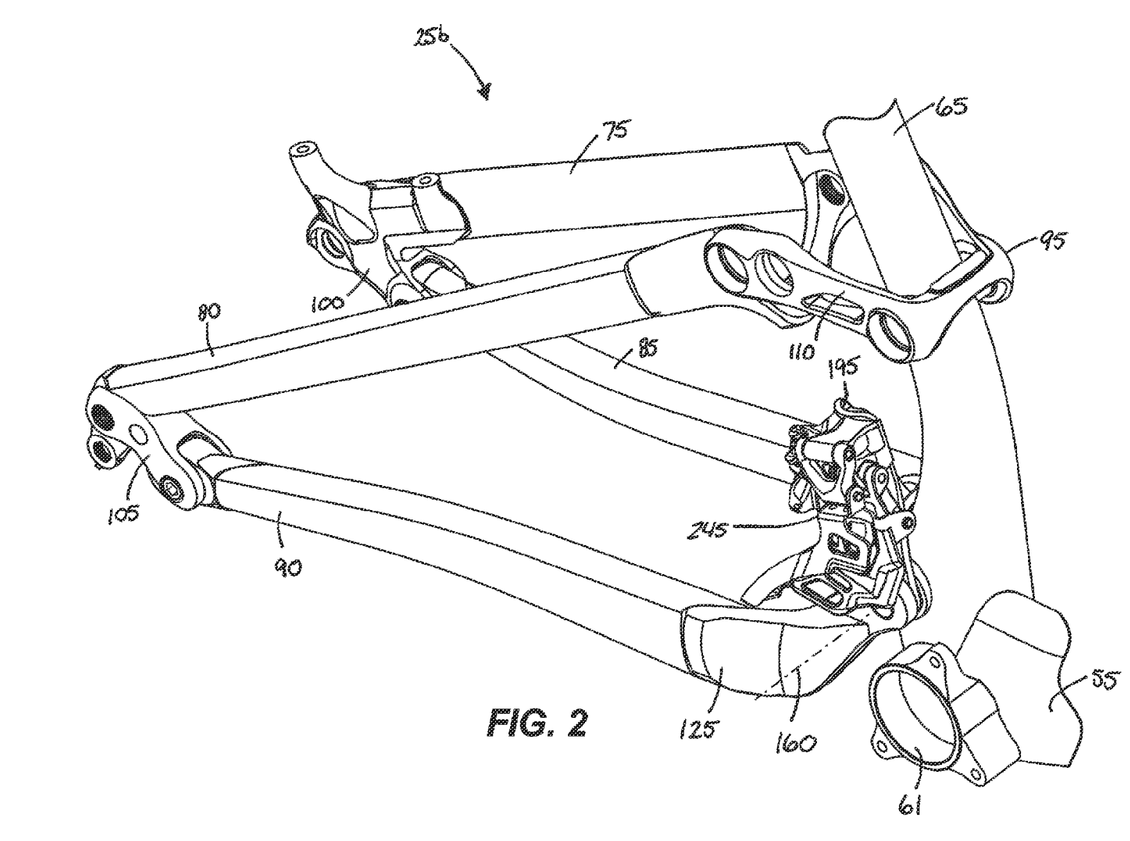
FIG. 2 is an enlarged perspective view of a portion of the bicycle frame, the front derailleur mount, and a front derailleur coupled to the derailleur mount.

With reference to FIGS. 1 and 2, the rear frame 25b has a left seatstay 75, a right seatstay 80, a left chainstay 85, a right chainstay 90, and a suspension mount 95. A left dropout 100 is disposed at a lower end of the left seatstay 75 and is connected to the left chainstay 85. A right dropout 105 is disposed at the lower end of the right seatstay 80 and is connected to the right chainstay 90. The left and right dropouts 100, 105 attach the rear wheel 20 to the frame 25.

Figure 7:
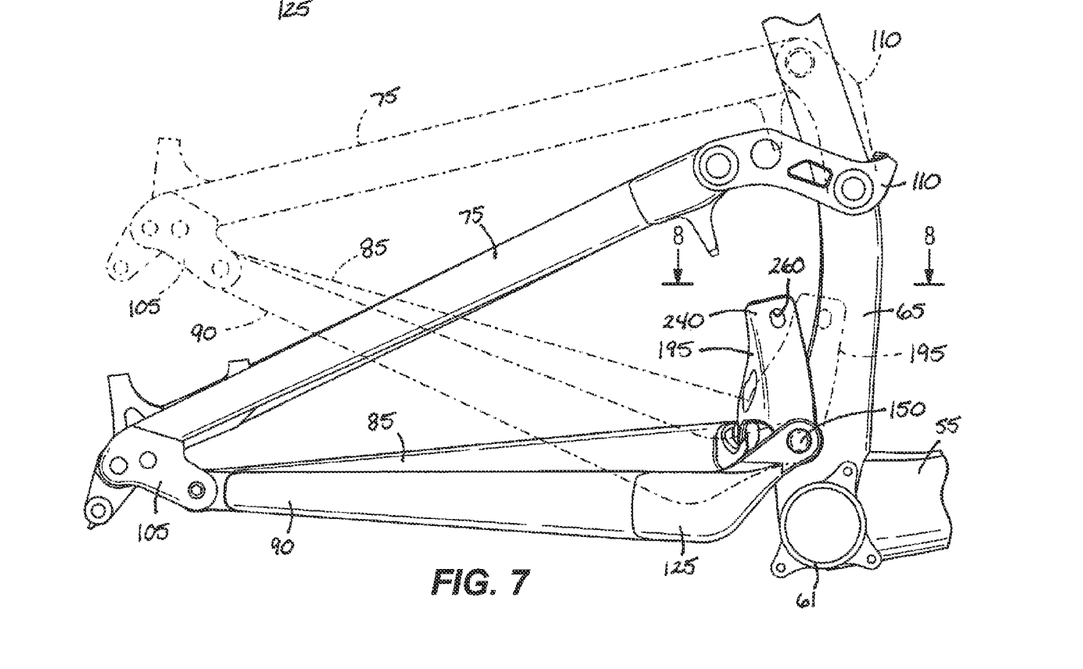
FIG. 7 is a side view of the bicycle frame portion of FIG. 2 illustrating a rear triangle of the frame, the front derailleur mount, and the front derailleur in first and second positions.

With reference to FIGS. 2 and 7, the rear frame 25b is pivotally connected to the main frame 25a by the suspension mount 95 and the chainstays 85, 90. The suspension mount 95 has a seatstay link 110 that pivotally connects the seatstays 75, 80 to the seat tube 65 using fasteners (not shown) such that the rear frame 25b can pivot relative to the seat tube 65. Referring back to FIG. 1, a yoke 115 attaches the seatstays 75, 80 and the suspension mount 95 to a suspension member or shock 120 that is connected to the top tube 50.

Figure 3:
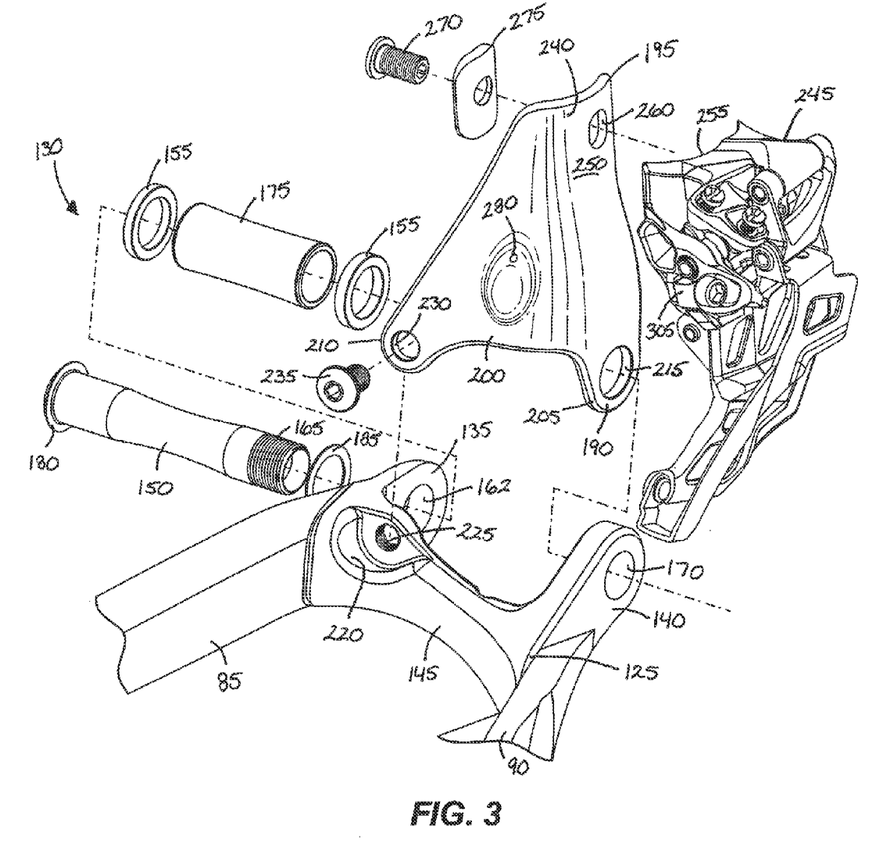
FIG. 3 is an exploded perspective view of a portion of the bicycle frame, the front derailleur mount, and the front derailleur.
Figures 4, 5:
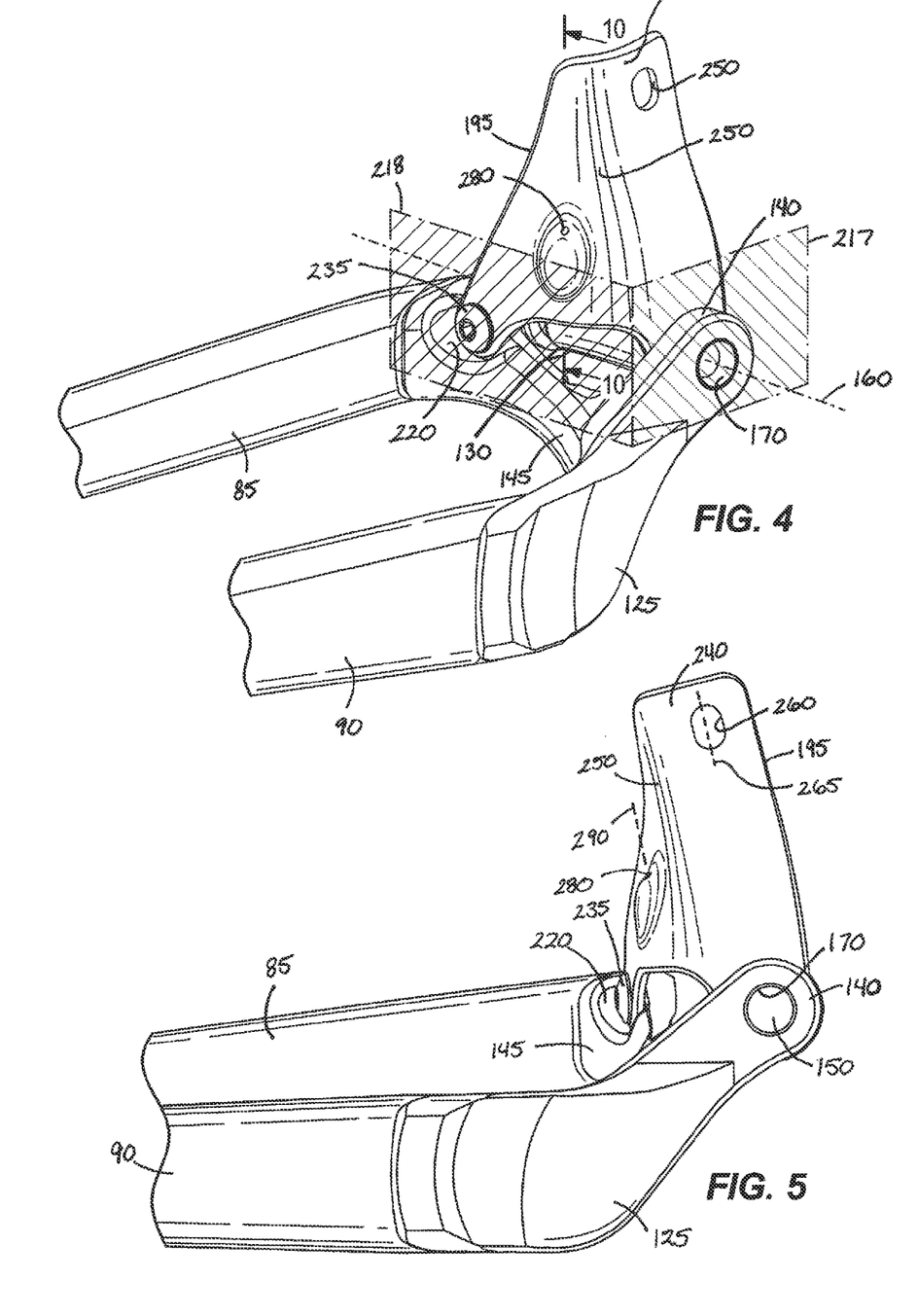
FIG. 4 is a perspective view of the bicycle frame portion of FIG. 3 and the derailleur mount.
FIG. 5 is a side view of the bicycle frame portion and the derailleur mount of FIG. 4.
Figure 6:
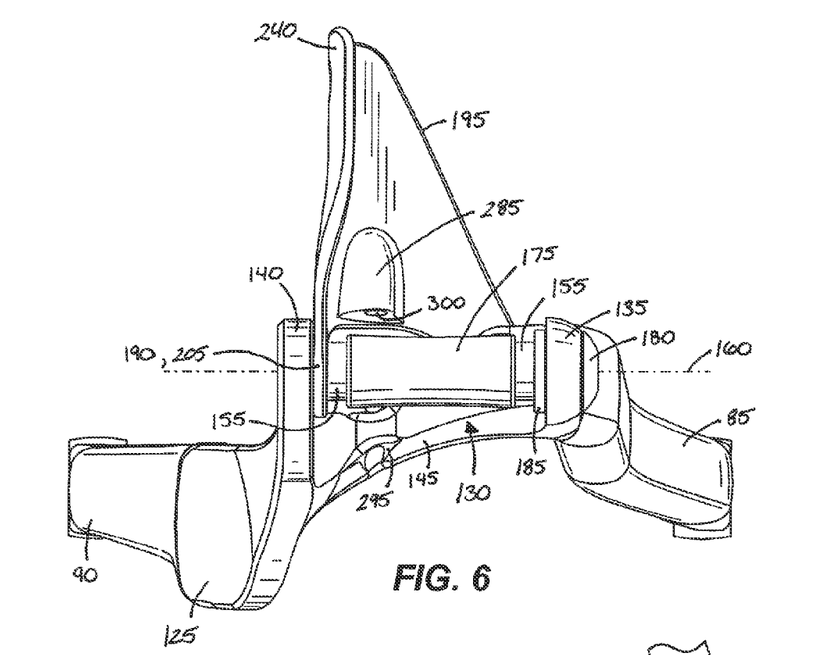
FIG. 6 is a front view of the bicycle frame portion and the derailleur mount of FIG. 4.

FIGS. 3, 4, and 6 show a chainstay link 125 that connects the left chainstay 85 and the right chainstay 90, and a bearing assembly 130 pivotally connects the chainstays 85, 90 to the seat tube 65 adjacent the bottom bracket 62 via the chainstay link 125. The chainstay link 125 can be integral to the chainstays 85, 90, or can be provided as a separate component that is attached to the chainstays 85, 90. As illustrated, the chainstay link 125 includes a left arm portion 135 that is positioned on one side of the seat tube 65, a right arm portion 140 that is positioned on the other side of the seat tube 65, and a bridge 145 that interconnects the left arm portion 135 and the right arm portion 140.

The illustrated bearing assembly 130 includes a bearing axle 150 and bearings 155 (e.g., cartridge bearings, cone bearings, etc.) that are positioned adjacent both ends of the bearing axle 150 to support pivotal movement of the rear frame 25b relative to the main frame 25a. The bearing axle 150 defines a rear frame pivot axis 160 and extends through a hole 162 in the left arm portion 135 and through the seat tube 65 such that a threaded end 165 of the bearing axle 150 is engageable with a threaded hole 170 in the right arm portion 140. Also, a spacer tube 175 is coupled to the bearing axle 150 between the bearings 155 to space the bearings 155 apart from each other along the axle. That is, the spacer tube 175 maintains the distance between the opposed bearings 155 when the bearing assembly 130 is positioned in the seat tube.

Figure 8:
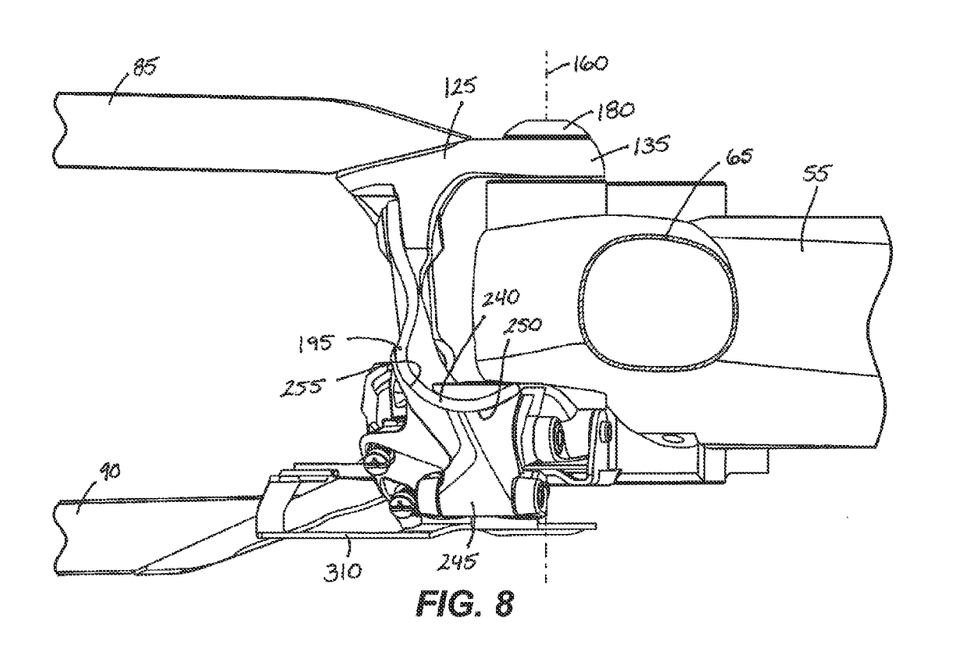
FIG. 8 is a top view of the bicycle frame portion taken along line 8-8 in FIG. 7 with the rear frame triangle, the front derailleur mount, and the front derailleur in the first position.
Figure 9:
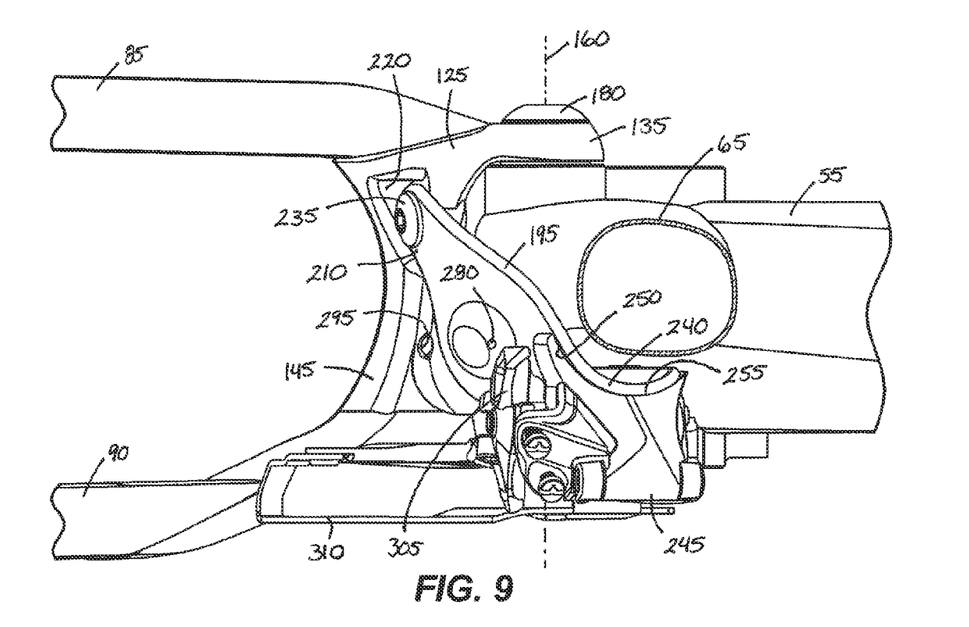
FIG. 9 is the top view of FIG. 8 with the rear frame triangle, the front derailleur mount, and the front derailleur in the second position.

As shown in FIGS. 6, 8, and 9, the bearing axle 150 has a non-threaded end or head 180 that abuts the left arm portion 135 of the chainstay link 125. With reference to FIGS. 3 and 6, a first spacer 185 is positioned between the left arm portion 135 and the bearing 155 is located closest to the bearing axle head 180. As described in detail below, a second spacer 190 is positioned between the right arm portion 140 and the bearing 155 located closest to the threaded end 165 of the bearing axle 150.

FIGS. 2-9 illustrate a derailleur mount 195 that includes a mounting portion 200 coupled to a forward end of the rear frame 25b such that a portion of the derailleur mount 195 is positioned directly behind the seat tube 65. With reference to FIGS. 3-6, the mounting portion 200 includes a first mounting portion 205 (e.g., flange) that is disposed on one side of the central plane, and a second mounting portion 210 that is positioned on an opposite side of the central plane. Stated another way, the illustrated derailleur mount 195 extends across the central plane and is attached to the rear frame 25b at two distinct points.

The first mounting portion 205 is concentric with the pivot axis 160 and has an opening 215 through which the bearing axle 150 extends so that the threaded end 165 can engage the right arm portion 140. As shown in FIG. 6, the first mounting portion 205 is sandwiched between the rear frame 25b and one of the bearings 155. That is, the first mounting portion 205 acts as the second bearing spacer for the bearing assembly 130.

Referring to FIGS. 3-6, the illustrated first mounting portion 205 is plate-like and defines a first mounting plane 217 that is perpendicular to the pivot axis 160. The second mounting portion 210 is non-parallel to the first mounting portion 205 and is secured to the rear frame 25b at a location that is spaced laterally from the first mounting plane 217. As illustrated, the second mounting portion 210 defines a second mounting plane 218 that is substantially perpendicular to the first mounting plane 217 and is positioned directly behind the seat tube 65.

FIGS. 3, 4, 8, and 9 show that the second mounting portion 210 is attached to the chainstay link 125 along the bridge 145 adjacent the left chainstay 85. More specifically, the bridge 145 defines a recessed area 220 that has a fastener hole 225, and the second mounting portion 210 is positioned within the recessed area 220 so that an opening 230 in the second mounting portion 210 is aligned with the fastener hole 225 when the derailleur mount 195 is assembled onto the rear frame 25b. As illustrated, the recessed area 220 has an arcuate shape that conforms to the shape of the second mounting portion 210. A fastener 235 secures the second mounting portion 210 to the chainstay link 125. As shown in FIG. 3, the area between the first and second mounting portions 205, 210 along a lower edge of the derailleur mount 195 is recessed to avoid interference between the bridge 145 and the derailleur mount 195.

The derailleur mount 195 also includes a support portion 240 that supports a front derailleur 245. The support portion 240 is disposed above the mounting portion so that the derailleur 245 is positioned adjacent and partially above the drive train 60 to guide the chain 62 relative to the front sprocket assembly 63. With continued reference to FIGS. 3, 4, 8, and 9, the support portion 240 has a convex surface 250 and the derailleur 245 has a concave surface 255 that conforms to and receives the convex surface 250 to locate and orient the derailleur 245 on the derailleur mount 195.

The support portion 240 also has an elongated opening or slot 260 that defines a support axis 265 extending in the elongated direction. As illustrated, the slot 260 is elongated in a substantially vertical direction (e.g., parallel to the seat tube 65) to permit height adjustment for the derailleur 245 relative to the drive train 60. The derailleur 245 has a threaded aperture (e.g., a blind hole, not shown) that aligns with the slot 260, and a fastener 270 extends through the slot 260 into the threaded aperture to secure the derailleur 245 to the derailleur mount 195. As illustrated, a wedge 275 is positioned between the derailleur mount 195 and the fastener 270 to assist with holding the derailleur 245 in the desired position. The slot 260 is wider than the fastener 270 to allow limited rotational adjustment of the front derailleur 245 relative to the support portion 240.

FIGS. 3-6 and 9 illustrate that the derailleur mount 195 also includes a cable opening 280 that is adapted to receive a derailleur cable 282, and a cable stop 285 that is aligned with the cable opening 280. The cable opening 280 defines a cable axis 290 along which the derailleur cable 282 extends, and as illustrated, the cable axis 290 is substantially parallel with the support axis 265 defined by the slot 260 in the support portion 240.

Figure 10:
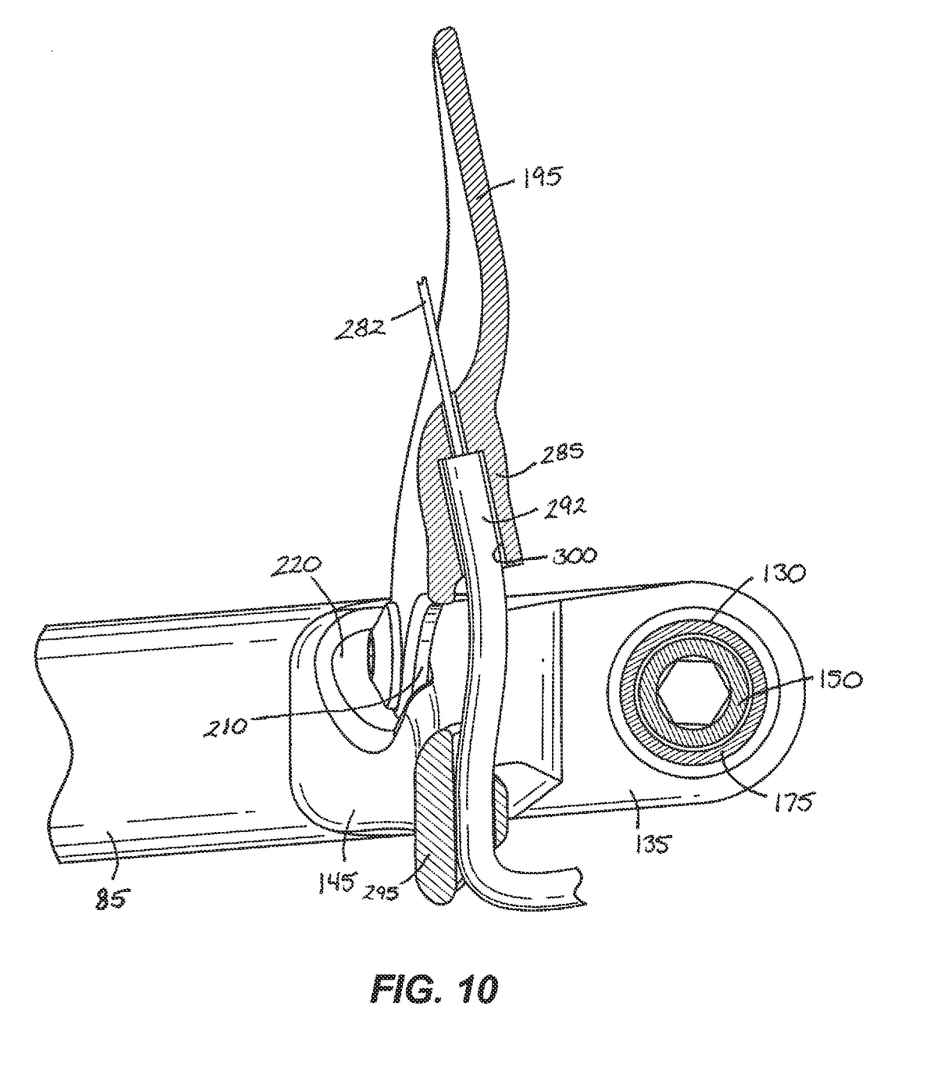
FIG. 10 is a section view of the front derailleur mount and a portion of the rear frame triangle taken along line 10-10 in FIG. 4.

As is known in the art, the derailleur cable 282 extends from the handlebar assembly 40 to the derailleur 245 so that a user can actuate the derailleur 245. At least a portion of the cable 282 is enclosed by a cable housing 292 to protect the cable 282 from abrasion. With reference to FIG. 10, the cable housing 292 extends generally upward from adjacent the bottom bracket 62 through a cable housing guide 295 defined by the bridge 145. The cable housing 292 terminates in a recess 300 defined by the cable stop 285, and an exposed portion of the cable 282 extends from the cable stop 285 through the cable opening 280. The cable 282 further extends generally upward and is secured to a cable attachment portion 305 on the derailleur 245.

The conforming curved surfaces 250, 255 defined by the support portion 240 and the derailleur 245 permit rotational alignment of the derailleur 245 relative to the drive train 60, and the slot 260 in the support portion 240 permits vertical adjustment of the derailleur 245 relative to the drive train 60. Also, the first mounting portion 205 permits pivotal movement of the derailleur mount 195 and the derailleur 245 with the rear frame 25b relative to the main frame portion 25a, whereas the second mounting portion 210 orients the derailleur mount 195 and the derailleur 245 relative to the rear frame 25b. That is, the second mounting portion 210 stiffens the derailleur mount 195 and inhibits rotation about the pivot axis 160 absent pivotal movement of the rear frame 25b.

FIG. 7 illustrates the rear frame 25b when the suspension member 120 is in the suspension extension position (solid lines) and when the suspension member 120 is in the fully compressed position (dash-dot lines). With reference to FIGS. 7 and 8, when the suspension member 120 is in the suspension extension position, the derailleur mount 195 is positioned substantially behind a lateral plane extending through the seat tube and perpendicular to the central plane.

With reference to FIGS. 7 and 9, the shape of the derailleur mount 195 and attachment of the derailleur mount 195 to the pivotal rear frame 25*b* permit movement of the support portion 240 and the derailleur 245 relative to the seat tube 65. As shown in FIG. 9, when the suspension member 120 is compressed, the support portion 240 and the derailleur 245 are located substantially alongside the seat tube 65 such that the support portion 240 laterally overlaps with the seat tube 65. That is, the derailleur mount 195 partially wraps around the seat tube 65 when the suspension member 120 is compressed. With this structural arrangement, the derailleur 245 can swing alongside the seat tube 65 and in some cases at least partially forward of the seat tube 65. As a result, the seat tube 65 can be formed relatively straight between the bottom bracket 62 and the top tube 50, which increases the strength and stiffness of the main frame 25*a*.

By mounting the derailleur 245 to the derailleur mount 195 so that the derailleur 245 moves with the rear frame 25*b*, the chain 62 remains substantially aligned with a chain guide 310 of the derailleur 245 when the rear frame 25*b* pivots relative to the main frame 25*a*. This arrangement also avoids interference between the right chainstay 90 and the derailleur 245 when the rear frame 25*b* pivots relative to the main frame 25*a*. In addition, the cable housing guide 295, the cable stop 285, and the cable opening 280 direct the cable 282 substantially vertically through the chainstay link 125 and the derailleur mount 195 so that the cable 282 is aligned with the cable attachment portion 305.

The invention claimed is:

1. A bicycle comprising:
   a bicycle frame including a main frame and a rear frame coupled to the main frame for pivotal movement about a pivot axis;
   a derailleur mount coupled to the bicycle frame, the derailleur mount having:
      a first mounting portion concentric with the pivot axis and defining a plane;
      a second mounting portion secured to the rear frame at a location spaced laterally from the plane; and
      a support portion; and
   a derailleur attached to the support portion.

2. A bicycle as claimed in claim 1, further comprising a bearing pivotally supporting the rear frame relative to the main frame, wherein the derailleur mount is sandwiched between the rear frame and the bearing.

3. A bicycle as claimed in claim 1, further comprising a rear wheel that defines a central plane of the bicycle, and wherein the first mounting portion is positioned on one side of the central plane and the second mounting portion is positioned on an opposite side of the central plane.

4. A bicycle as claimed in claim 1, wherein the second mounting portion is substantially perpendicular to the first mounting portion.

5. A bicycle as claimed in claim 1, wherein the main frame includes a seat tube, and wherein the support portion laterally overlaps with the seat tube.

6. A bicycle as claimed in claim 5, wherein a portion of the derailleur mount is positioned directly behind the seat tube.

7. A bicycle as claimed in claim 1, wherein the support portion has a convex surface, and wherein the derailleur has a concave surface receiving the convex surface.

\* \* \* \* \*